(12) United States Patent
Park et al.

(10) Patent No.: US 8,018,542 B2
(45) Date of Patent: Sep. 13, 2011

(54) DISPLAY SUBSTRATE FOR EASY DETECTION OF PATTERN MISALIGNMENT

(75) Inventors: Jung-Joon Park, Chungcheongnam-do (KR); Min-Wook Park, Chungcheongnam-do (KR); Dong-Hyeon Ki, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 750 days.

(21) Appl. No.: 11/502,915

(22) Filed: Aug. 10, 2006

(65) Prior Publication Data

US 2007/0034522 A1   Feb. 15, 2007

(30) Foreign Application Priority Data

Aug. 10, 2005   (KR) .................... 10-2005-0073181

(51) Int. Cl.
*G02F 1/1333*   (2006.01)
(52) U.S. Cl. .......................................... 349/40; 349/42
(58) Field of Classification Search .................. None
See application file for complete search history.

(56) References Cited

U.S. PATENT DOCUMENTS

| | | | | |
|---|---|---|---|---|
| 5,304,925 A | * | 4/1994 | Ebina | 324/769 |
| 6,100,949 A | * | 8/2000 | Kim | 349/40 |
| 2004/0222385 A1 | * | 11/2004 | Hatajima | 250/491.1 |
| 2004/0222412 A1 | * | 11/2004 | Bai et al. | 257/40 |

* cited by examiner

*Primary Examiner* — Lucy P Chien
(74) *Attorney, Agent, or Firm* — Innovation Counsel LLP

(57) ABSTRACT

A display substrate includes a base substrate, a conductive line on the base substrate, a switching element and a testing member. The switching element includes a first electrode formed on the semiconductor layer pattern and electrically connected to the conductive line, and a second electrode spaced apart from the first electrode and semiconductor layer pattern. The testing member includes a conductive line testing portion that is formed from the same layer as the conductive line and an electrode testing portion that is formed from the same layer as the first electrode. The conductive line testing portion and the electrode testing portion have substantially the same width as the conductive line and the first electrode, respectively. The testing member also includes a semiconductor layer testing portion. The display substrate lends itself to efficient manufacturing with reduced process time and cost.

10 Claims, 14 Drawing Sheets

DISPLAY SUBSTRATE FOR EASY DETECTION OF PATTERN MISALIGNMENT

CROSS-REFERENCE TO RELATED APPLICATION

The present application claims priority from Korean Patent Application No. 2005-73181, filed on Aug. 10, 2005, the disclosure of which is hereby incorporated herein by reference in its entirety.

BACKGROUND OF THE INVENTION

1. Field of the Invention

The present invention relates to a display substrate, and more particularly, to a display substrate that lends itself to easy testing.

2. Description of the Related Art

A display device typically includes an array substrate. The array substrate includes a plurality of gate lines, a plurality of data lines and a plurality of switching elements, such as thin-film transistors. The thin-film transistors make up part of a gate driving circuit that transmits gate signals to the gate lines. A data driving circuit is electrically connected to the data lines to transmit data signals to the data lines.

Each of the gate driving circuit, the thin-film transistors, etc., is formed through a photoresist process. Typically, the photoresist process includes a deposition process, a photoresist coating process, an exposure process, a development process, and an etching process, among other processes. When a condition is changed for one or more of the processes, the width of each of the patterns is changed. When the patterns become wider as a result of a change in the processing condition, a short circuit often forms between adjacent patterns. When the patterns become narrower as a result of a change in the processing condition, the patterns may become disconnected. The disconnection interferes with testing, thereby increasing the testing time.

Variation in the pattern width is especially problematic in a multi-layered structure, where differences between pattern widths in different layers could cause pattern misalignment that results in a defect. To reduce the overall defect rate without spending a long time on analyzing the misalignment, a method of quickly detecting the presence and degree of misalignment would be useful.

SUMMARY OF THE INVENTION

The present invention provides a display substrate that lends itself to being tested for misalignment easily. The present invention also provides a method of manufacturing the above-mentioned display substrate. The present invention also provides a method of testing the above-mentioned display substrate. The present invention also provides a liquid crystal display (LCD) device having the above-mentioned display substrate to improve an image display quality.

In one aspect, the invention is a display substrate that includes a base substrate, a conductive line, a switching element and a testing member. The conductive line is on the base substrate. The switching element includes a gate electrode, a semiconductor layer pattern, a first electrode and a second electrode. The gate electrode is on the base substrate. The semiconductor layer pattern is on the gate electrode. The first electrode is on the semiconductor layer pattern and electrically connected to the conductive line. The second electrode is spaced apart from the first electrode and is on the semiconductor layer pattern. The testing member includes a conductive line testing portion, an electrode testing portion and a semiconductor layer testing portion. The conductive line testing portion is formed from the same layer as the conductive line and has substantially the same width as the conductive line. The electrode testing portion formed from the same layer as the first electrode and has substantially the same width as the first electrode. The semiconductor layer testing portion is between the electrode testing portion and the base substrate.

In another aspect, the invention is a method of manufacturing a display substrate. The method entails forming a gate electrode and a gate insulating layer are on a base substrate such that the gate insulating layer covers the gate electrode. A semiconductor layer testing portion and a semiconductor layer pattern are formed such that the semiconductor layer pattern covers the gate electrode on the gate insulating layer. A conductive layer is deposited on the gate insulating layer having the semiconductor layer testing portion and the semiconductor layer pattern. The conductive layer is patterned to form a conductive line, a conductive line testing portion, a first electrode formed on the semiconductor layer pattern and electrically connected to the conductive line, a second electrode spaced apart from the first electrode, and an electrode testing portion on the semiconductor layer testing portion. The conductive line testing portion has substantially the same width as the conductive line. The electrode testing portion has substantially the same width as the first electrode. The first electrode and the second electrode are formed on the semiconductor layer pattern.

In another aspect, the invention is a method of testing a display substrate that includes a base substrate and a testing member formed on the base substrate. The testing member includes a gate testing portion, a data testing portion, and an electrode testing portion. In order to test the display substrate, the width of the gate testing portion is measured to determine the width of a gate line on the base substrate. In addition, the width of the data testing portion is measured to determine the width of a first electrode on the base substrate. Furthermore, the width of the electrode testing portion having substantially the same width as the first electrode is measured. Also, a distance between the gate testing portion and the data testing portion is measured to determine an amount of misalignment between a first layer and a second layer, wherein the first layer is formed into the gate line and the second layer is formed into the data line.

In yet another aspect, the invention is an LCD device that includes a first member, a second member and a liquid crystal layer. The first member includes a base substrate, a conductive line, a switching element and a testing member. The conductive line is on the base substrate. The switching element includes a gate electrode on the base substrate, a semiconductor layer pattern on the gate electrode, a first electrode formed on the semiconductor layer pattern and electrically connected to the conductive line, and a second electrode spaced apart from the first electrode and on the semiconductor layer pattern. The testing member includes a conductive line testing portion formed from a substantially same layer as the conductive line and having substantially the same width as the conductive line, an electrode testing portion formed from a substantially same layer as the first electrode and having substantially the same width as the first electrode, and a semiconductor layer testing portion between the electrode testing portion and the base substrate. The second member is positioned substantially parallel to the first member. The liquid crystal layer is interposed between the first member and the second member.

The display substrate may be any of an array substrate, a thin film transistor (TFT) substrate, a color filter on array (COA) substrate, etc. The display device may be a liquid crystal display (LCD) device, an organic light emitting display (OLED) device, a plasma display panel (PDP) device, etc.

With the substrate of the invention, a manufacturing time and a manufacturing cost of the display substrate are decreased. In addition, a yield of the display substrate is increased and an image display quality of the display device is improved.

BRIEF DESCRIPTION OF THE DRAWINGS

The above and other advantages of the present invention will become more apparent by describing in detailed example embodiments thereof with reference to the accompanying drawings, in which.

DESCRIPTION OF THE EMBODIMENTS

Figure 1:
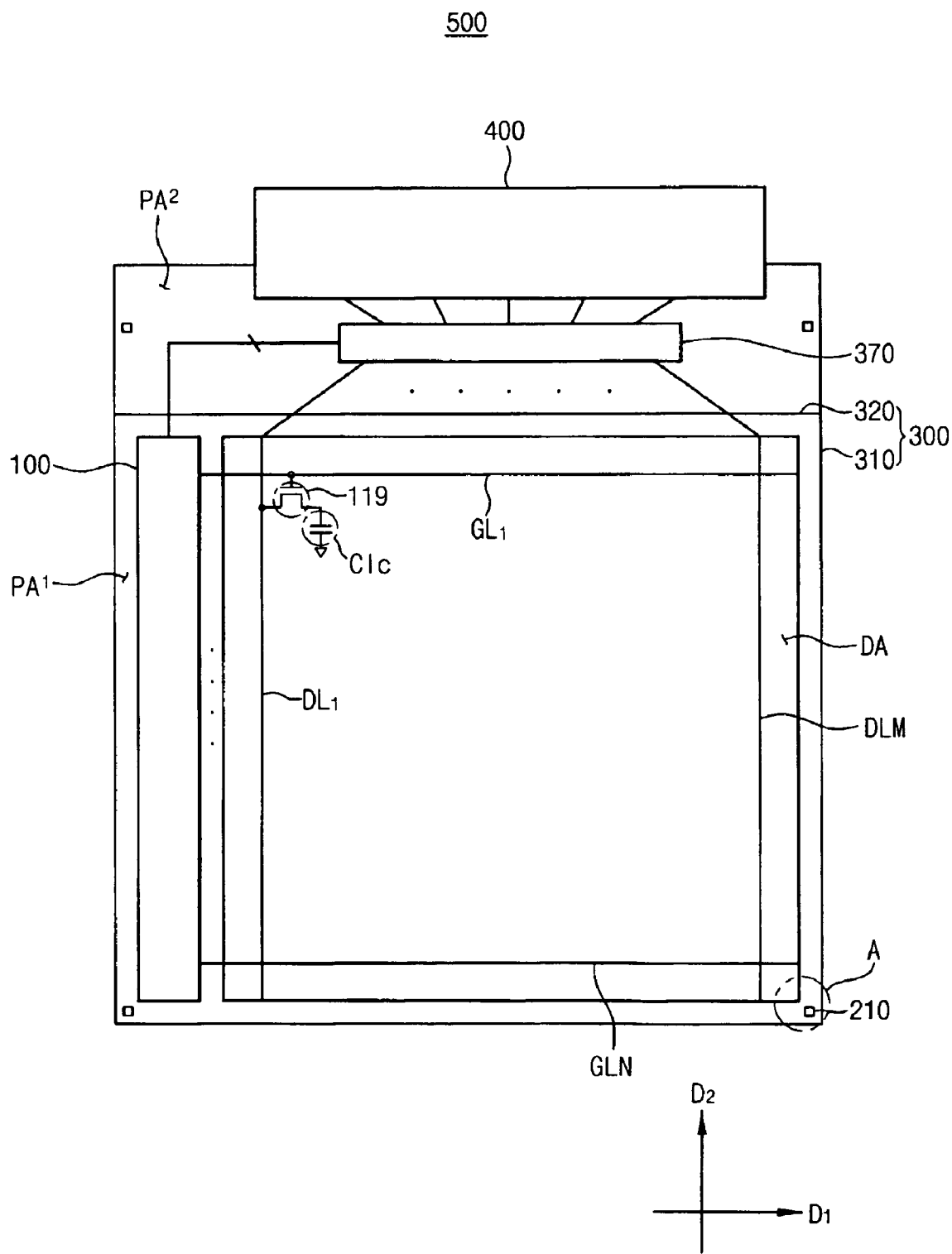
FIG. 1 is a plan view illustrating a liquid crystal display (LCD) device in accordance with one embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
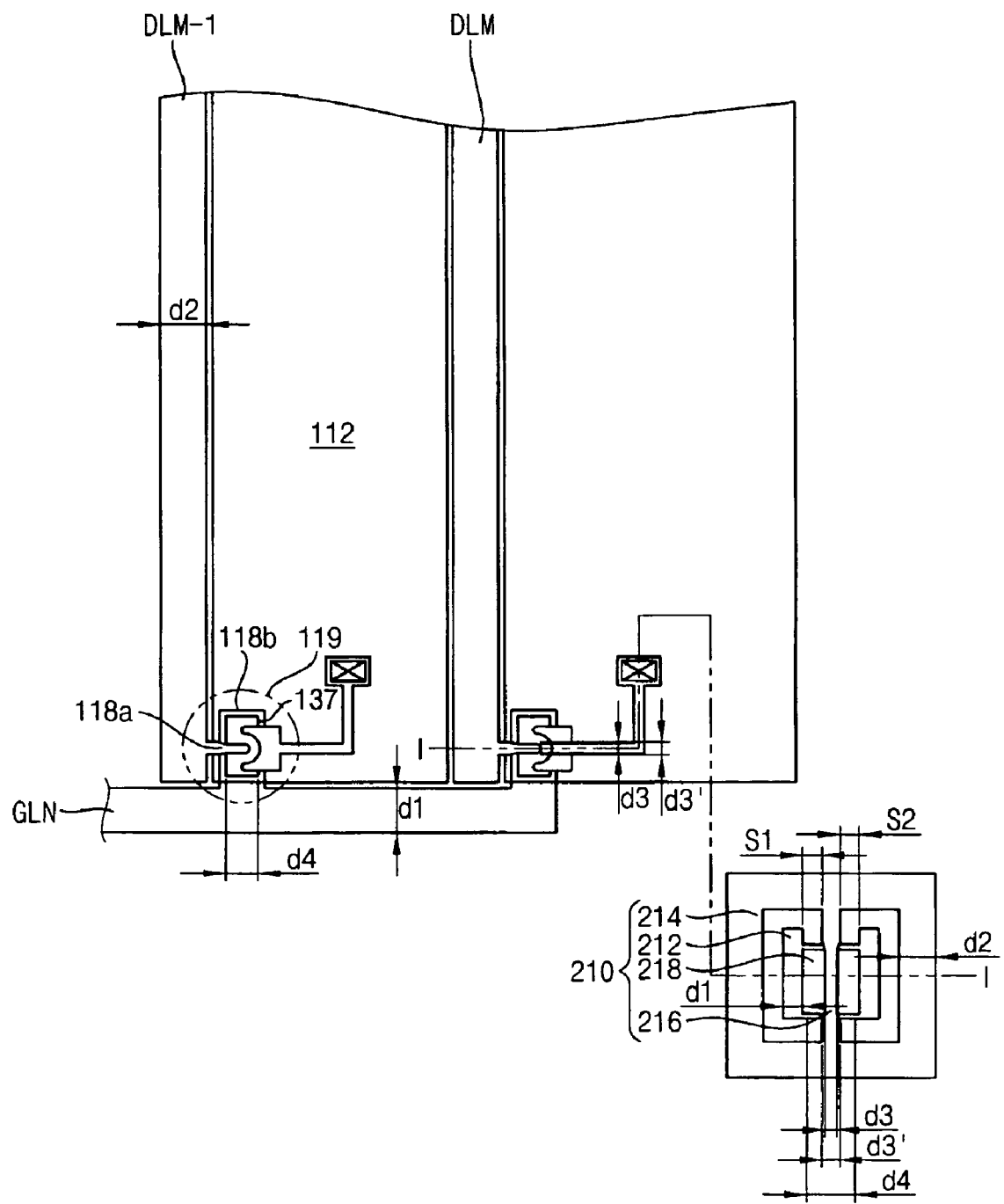
FIG. 2 is an enlarged plan view illustrating the portion 'A' shown in FIG. 1.
Figure 3:
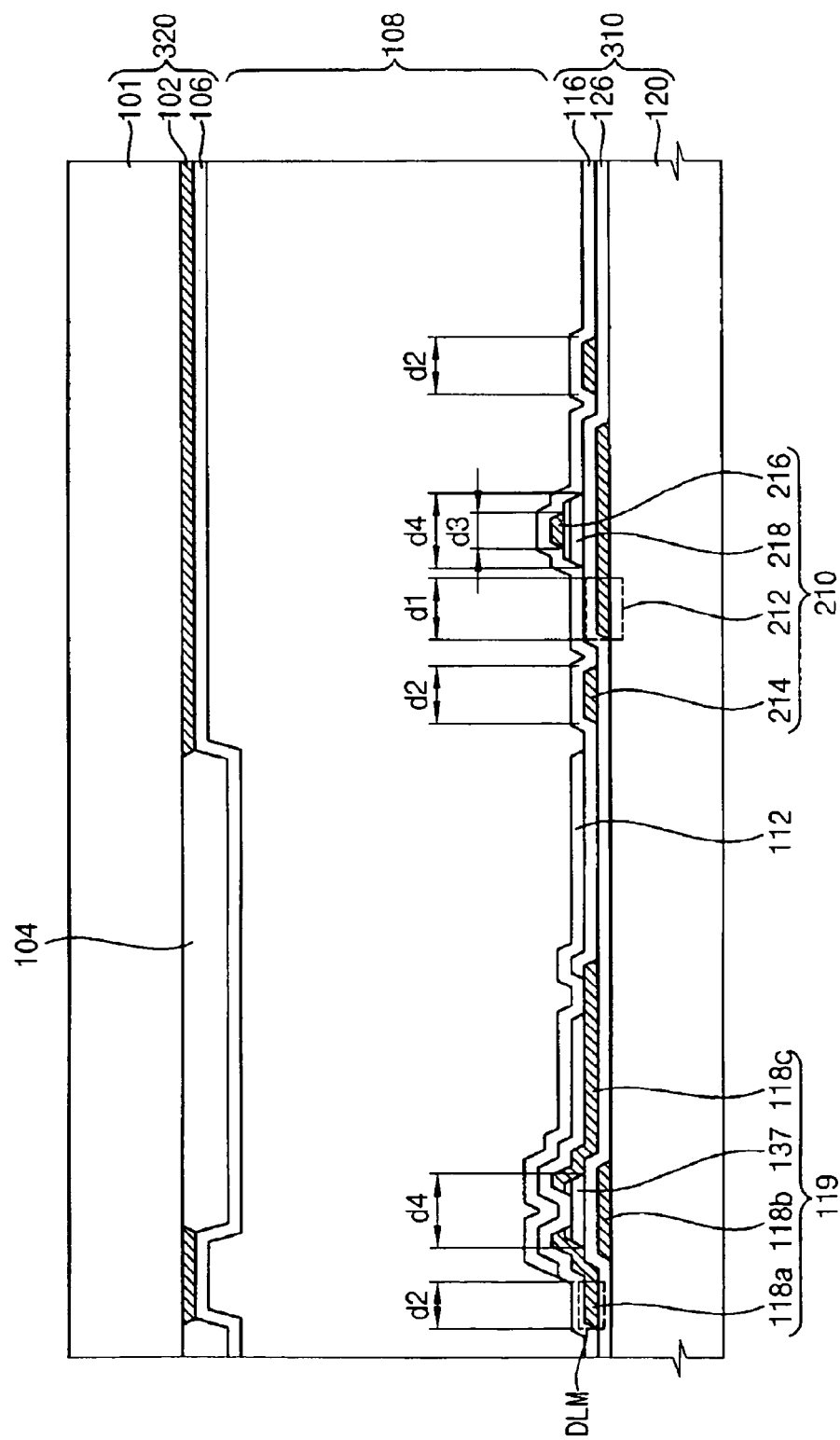
FIG. 3 is a cross-sectional view taken along the line I-I' shown in FIG. 2.

FIG. 1 is a plan view illustrating a liquid crystal display (LCD) device in accordance with one embodiment of the present invention. FIG. 2 is an enlarged plan view illustrating the portion 'A' shown in FIG. 1. FIG. 3 is a cross-sectional view taken along the line I-I' shown in FIG. 2.

Referring to FIGS. 1 to 3, the LCD device includes a gate driving circuit 100, an LCD panel 300, a data driving circuit 370 and a flexible circuit board 400.

The LCD panel 300 includes a first substrate 310, a second substrate 320 and a liquid crystal layer 108. The second substrate 320 combines with the first substrate 310. The liquid crystal layer 108 is interposed between the first and second substrates 310 and 320. Liquid crystals of the liquid crystal layer 108 vary their arrangement in response to an electric field applied to the liquid crystal layer 108, thus changing the light transmittance of the liquid crystal layer 108 to display an image.

The first substrate 310 is divided into a display region DA, a first peripheral region PA1 and a second peripheral region PA2. The first and second peripheral regions PA1 and PA2 are adjacent to the display region DA. The first peripheral region PA1 is adjacent to a side of the first substrate 310. The second peripheral region PA2 is adjacent to another side of the first substrate 310 and contacts the first peripheral region PA1.

The first substrate 310 includes a lower substrate 120, a plurality of gate lines GL1, GL2, . . . GLN, a plurality of data lines DL1, DL2, . . . DLM, a plurality of pixel thin-film transistors 119, a gate insulating layer 126, a passivation layer 116, a plurality of liquid crystal capacitors Clc and a plurality of pixel electrodes 112. The first substrate 310 may further include a plurality of testing members 210 adjacent to corners of the first substrate 310. In FIGS. 1 to 3, values that are measured by the testing members 210 are compared to determine the level of variation in the pattern widths in the first substrate 310.

The lower substrate 120 may contain a transparent glass, a transparent quartz, etc. that allows light to pass through the lower substrate 120. The lower substrate 120 preferably does not include alkaline ions. When the lower substrate 120 includes the alkaline ions, the alkaline ions may dissolve in a liquid crystal layer (not shown) and decrease the resistivity of the liquid crystal layer (not shown). The decreased resistivity in the liquid crystal layer degrades image display quality and weakens the adhesive strength between a sealant (not shown) and the lower substrate 120. In addition, electrical characteristics of the thin-film transistor 119 may be deteriorated.

In some embodiments, the lower substrate 120 may contain a transparent high polymer. Examples of the transparent high polymer that can be used for the lower substrate 120 include triacetylcellulose (TAC), polycarbonate (PC), polyethersulfone (PES), polyethyleneterephthalate (PET), polyethylenenaphthalate (PEN), polyvinylalcohol (PVA), polymethylmethacrylate (PMMA), cyclo-olefin polymer (COP), etc.

The lower substrate 120 may be optically isotropic or optically anisotropic, depending on the embodiment.

The gate lines GL1, GL2, . . . GLN are extended in a first direction D1 on the lower substrate 120. Each of the gate lines GL1, GL2, . . . GLN is electrically connected to one of a plurality of output terminals of the gate driving circuit 100 in the first peripheral region PA1. The gate lines GL1, GL2, . . . GLN and the data lines DL1, DL2, . . . DLM define a plurality of pixel regions that are arranged in a matrix shape.

The pixel thin-film transistors 119 are on the lower substrate 120. Each of the pixel thin-film transistors 119 includes a source electrode 118a, a gate electrode 118b, a drain electrode 118c and a semiconductor layer pattern 137. The gate electrode 118b is on the lower substrate 120 and electrically connected to each of the gate lines GL1, GL2, . . . GLN. The source electrode 118a is electrically connected to each of the data lines DL1, DL2, . . . DLN. The drain electrode 118c is electrically connected to each of the pixel electrodes 112 of the liquid crystal capacitor Clc. The semiconductor layer pattern 137 is on the gate electrode 118b between the source and drain electrodes 118a and 118c. A portion of the source electrode 118a is on the gate insulating layer 126, and the remaining portion of the source electrode 118a is on the semiconductor layer pattern 137. A width d3' (shown in FIG. 2) of the portion of the source electrode 118a on the gate insulating layer 126 is greater than a width d4 of the remaining portion of the source electrode 118a on the semiconductor layer pattern 137.

The testing members 210 are on the lower substrate 120. Each of the testing members 210 includes a gate testing portion 212, a data testing portion 214, an electrode testing portion 216 and a semiconductor layer testing portion 218.

The gate testing portion 212 is formed from the same layer as the gate lines GL1, GL2, . . . GLN. Alternatively, the gate testing portion 212 may be formed on the same layer as the gate lines GL1, GL2, . . . GLN. A width d1 of the gate testing portion 212 is substantially the same as the width of each of the gate lines GL1, GL2, . . . GLN. The data testing portion 214 is formed from the same layer as the data lines DL1, DL2, . . . DLM. Alternatively, the data testing portion 214 may be formed on the same layer as the data lines DL1, DL2, . . . DLM. A width d2 of the data testing portion 214 is substantially the same as the width of each of the data lines DL1, DL2, . . . DLM. The semiconductor layer testing portion 218 is formed from the same layer as the semiconductor layer pattern 137. Alternatively, the semiconductor layer testing portion 218 may be formed on the same layer as the semiconductor layer pattern 137. A width d4 of the semiconductor layer testing portion 218 is substantially the same as the width of the semiconductor layer pattern 137. That is, the gate testing portion 212 is on the lower substrate 120, and the data testing portion 214 is on the gate insulating layer 126. The semiconductor layer testing portion 218 is on the gate insulating layer 126. The electrode testing portion 216 is formed from the same layer as the source electrode 118a. Alternatively, the electrode testing portion 216 may be on the same layer as the source electrode 118a. The electrode testing portion 216 has two widths d3 and d3' that are substantially the same as the source electrode 118a (see FIG. 2). That is, a portion of the electrode testing portion 216 is on the gate insulating layer 126, and the remaining portion of the electrode testing portion 216 is on the semiconductor layer testing portion 218. The width d3' of the portion of the electrode testing portion 216 that is on the gate insulating layer 126 is greater than the width d3 of the remaining portion of the electrode testing portion 216 on the semiconductor layer testing portion 218.

In FIGS. 1 to 3, the gate testing portion 212 is substantially centered on the data testing portion 214. Similarly, the semiconductor layer testing portion 218 is substantially centered on the gate testing portion 212. The electrode testing portion 216 is on a center line of the data testing portion 214, the gate testing portion 212 and the semiconductor layer testing portion 218. Distances S1 and S2 between the gate testing portion 212 and the electrode testing portion 216 are measured to test the alignment between the layer in which the gate lines GL1, GL2, . . . GLN are formed and the layer in which the data lines DL1, DL2, . . . DLM are formed. When the layer where the gate lines GL1, GL2, . . . GLN are formed is misaligned with respect to the layer where the data lines DL1, DL2, . . . DLM are formed, the distance S1 between a right portion of the gate testing portion and the electrode testing portion 216 is different from the distance S2 between a left portion of the gate testing portion and the electrode testing portion 216.

The gate insulating layer 126 is on the lower substrate 120 having the gate electrode 118b, the gate lines GL1, GL2, . . . GLN and the gate testing portion 212, so that the gate electrode 118b, the gate lines GL1, GL2, . . . GLN and the gate testing portion 212 are electrically insulated from the source electrode 118a, the drain electrode 118c, the semiconductor layer pattern 137 and the data lines DL1, DL2, . . . DLM. The gate insulating layer 126 contains an insulating material. Examples of the insulating material that can be used for the gate insulating layer 126 include silicon nitride and silicon oxide.

The data lines DL1, DL2, . . . DLM extend in a second direction $D_2$ on the lower substrate 120. The second direction D2 is substantially perpendicular to the first direction $D_1$. Each of the data lines DL1, DL2, . . . DLN is electrically connected to the data driving circuit 370 in the second peripheral region PA2.

The passivation layer 116 is deposited on the lower substrate 120 having the gate lines GL1, GL2, . . . GLN, the data lines DL1, DL2, . . . DLM, the gate insulating layer 126, the pixel thin-film transistors 119 and the testing members 210. The passivation layer 116 contains an insulating material. Examples of the insulating material that can be used to form the passivation layer 116 include silicon nitride and silicon oxide, among others. Alternatively, the passivation layer 116 may include a transparent organic material. The passivation layer 116 may have a contact hole through which the drain electrode 118*c* is partially exposed.

The first substrate 310 may further include a storage capacitor (not shown) to maintain a voltage difference between the pixel electrode 112 and a common electrode 106 for one frame.

The pixel electrode 112 is on the passivation layer 116 corresponding to each of the pixel regions. The pixel electrode 112 is electrically connected to the drain electrode 118*c* through the contact hole.

The second substrate 320 is combined with the first substrate 310. The second substrate 320 includes an upper substrate 101, a black matrix 102, a color filter 104, the common electrode 106 and a spacer (not shown).

The lower substrate 120 includes glass, quartz, or a synthetic resin, among other possibilities. In the embodiment of FIGS. 1 to 3, the lower substrate 120 may be made of substantially the same material as the upper substrate 101.

The black matrix 102 is on the upper substrate 101 to block the light passing through a region in which the liquid crystals of the liquid crystal layer 108 is incontrollable, thereby improving an image display quality. In FIGS. 1 to 3, the black matrix 102 corresponds to the gate and data lines GL1, GL2, . . . GLN and DL1, DL2, . . . DLM. The black matrix 102 may contain an opaque organic material including a photoresist or a metallic material. The opaque organic material that can be used for the black matrix 102 includes carbon black, a pigment compound, and a colorant compound, among others. The pigment compound may include a red pigment, a green pigment and a blue pigment, and the colorant compound may include a red colorant, a green colorant and a blue colorant. The metallic material that can be used for the black matrix 102 includes chrome (Cr), chrome oxide (CrOx), chrome nitride (CrNx), etc.

The color filter 104 is on the upper substrate 101 having the black matrix 102 to transmit light having a predetermined wavelength. The color filter 104 corresponds to the pixel regions. The color filter 104 may include a photo initiator, a monomer, a binder, a pigment, a dispersant, a solvent, a photoresist, etc.

The common electrode 106 is on the upper substrate 101 having the black matrix 102 and the color filter 104. The common electrode 106 includes a transparent conductive material. Examples of the transparent conductive material that can be used for the common electrode 106 include indium tin oxide (ITO), tin oxide (TO), indium zinc oxide (IZO), zinc oxide (ZO), indium tin zinc oxide (ITZO), and amorphous indium tin oxide (a-ITO), among others.

A spacer (not shown) is formed on the upper substrate 101 having the black matrix 102, the color filter 104 and the common electrode 106. The first substrate 310 is spaced apart from the second substrate 320 by the spacer (not shown). In some embodiments, the spacer (not shown) may have a column shape. In alternative embodiments, the spacer (not shown) may be a ball shaped spacer or a mixture of the column shaped spacer and the ball shaped spacer.

FIGS. 4 to 12 are cross-sectional views illustrating a method of manufacturing the LCD device shown in FIG. 1.

Figure 4:
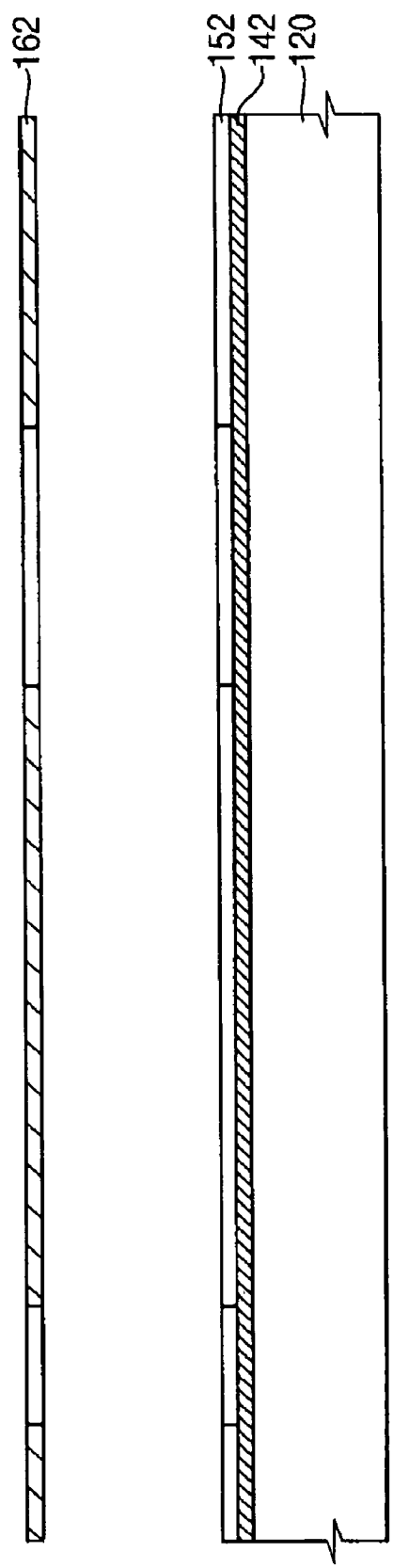
FIGS. 4 to 12 are cross-sectional views illustrating a method of manufacturing the LCD device shown in FIG. 1.

Referring to FIGS. 2 and 4, a first conductive layer 142 is deposited on the lower substrate 120. A first photoresist layer 152 is coated on the first conductive layer 142. The first photoresist layer 152 may be a positive-type photoresist or a negative-type photoresist. The first photoresist layer 152 is exposed through a first mask 162. The first mask 162 includes a plurality of reticles corresponding to the gate lines GL1, GL2, . . . GLN, the gate electrode 118*b* and the gate testing portion 212, respectively. Each of the reticles corresponding to the gate lines GL1, GL2, . . . GLN, the gate electrode 118*b* and the gate testing portion 212 has a constant width d1 that that corresponds to the width of the gate lines GL1, GL2, . . . GLN, the gate electrode 118*b* and the gate testing portion 212.

Figure 5:
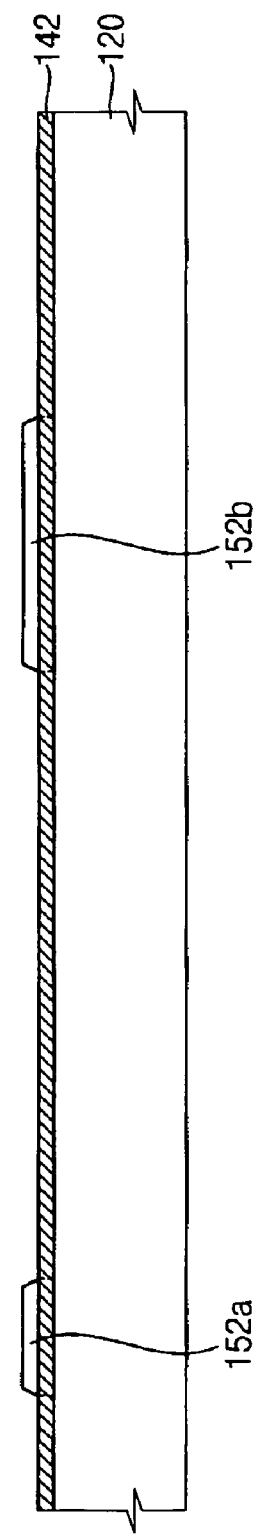

As shown in FIG. 5, the exposed first photoresist layer 152 is developed to form a plurality of photoresist patterns 152*a* and 152*b* corresponding to the gate lines GL1, GL2, . . . GLN, the gate electrode 118*b* and the gate testing portion 212, respectively, on the first conductive layer 142.

Figure 6:
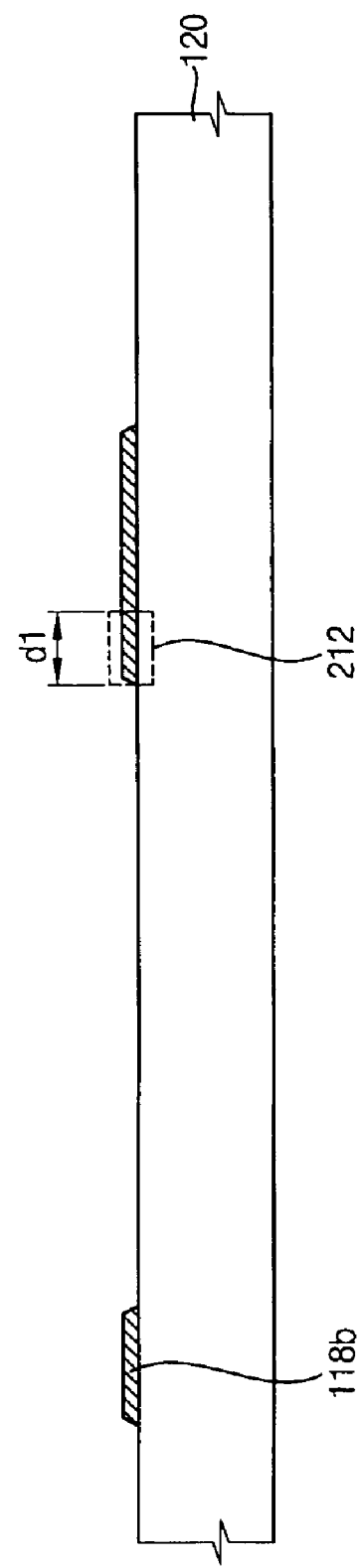

Referring to FIGS. 2 and 6, the first conductive layer 142 is partially etched using the photoresist patterns 152*a* and 152*b* as an etching mask to form the gate lines GL1, GL2, . . . GLN, the gate electrode 118*b* and the gate testing portion 212. After the partial etching of the first conductive layer 142, the photoresist patterns 152*a* and 152*b* are removed.

Figure 7:
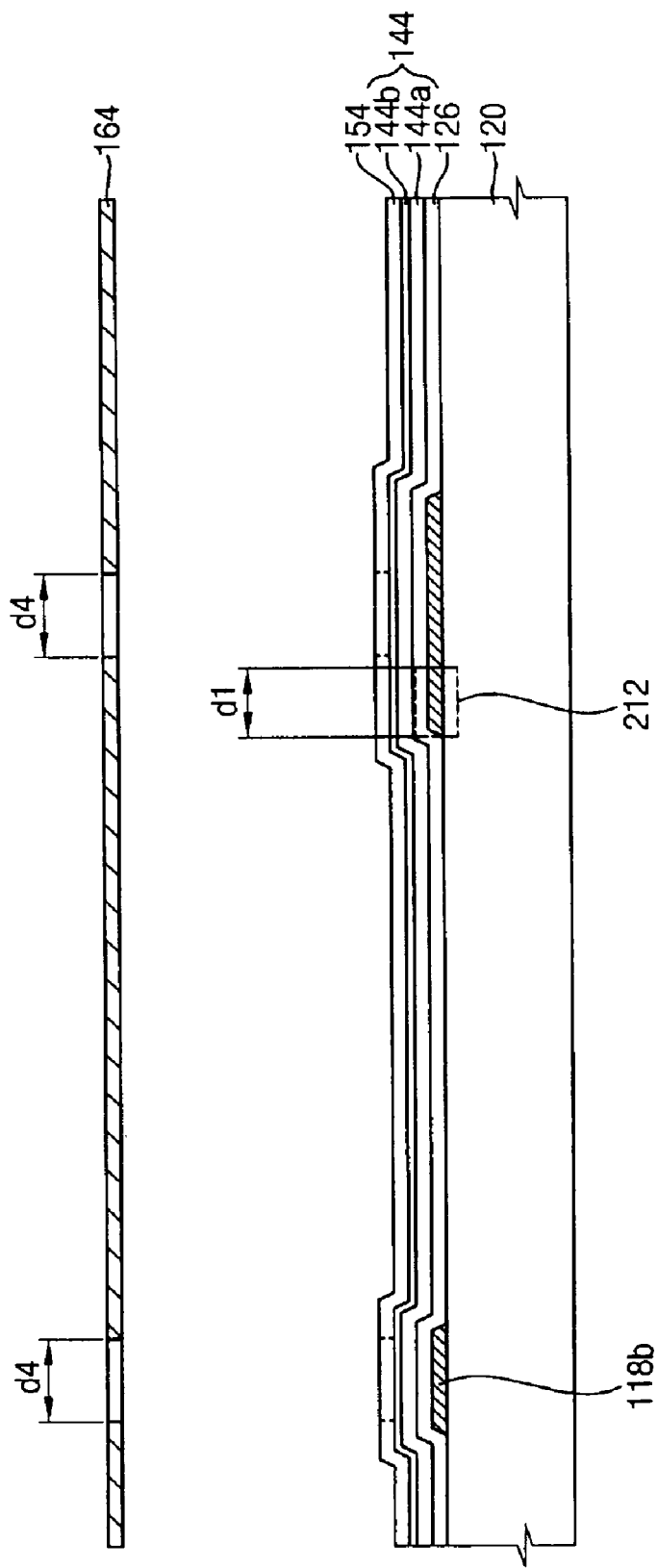

Referring to FIGS. 2 and 7, the gate insulating layer 126 is deposited on the lower substrate 120 having the gate lines GL1, GL2, . . . GLN, the gate electrode 118*b* and the gate testing portion 212. An amorphous silicon layer is deposited on the gate insulating layer 126. Impurities are implanted on an upper portion of the amorphous silicon layer to form a semiconductor layer 144 having a channel layer 144*a* and an ohmic contact layer 144*b*. The ohmic contact layer 144*b* is on the channel layer 144*a* and includes an N+ amorphous silicon. A second photoresist layer 154 is coated on the semiconductor layer 144. The second photoresist layer 154 is exposed using a second mask 164. The second mask 164 includes a plurality of reticles corresponding to the semiconductor layer pattern 137 and the semiconductor layer testing portion 218. Each of the reticles corresponding to the semiconductor layer pattern 137 and the semiconductor layer testing portion 218 has a constant width d4 that is substantially the same as the width of the semiconductor layer pattern 137 and the semiconductor layer testing portion 218.

Figure 8:
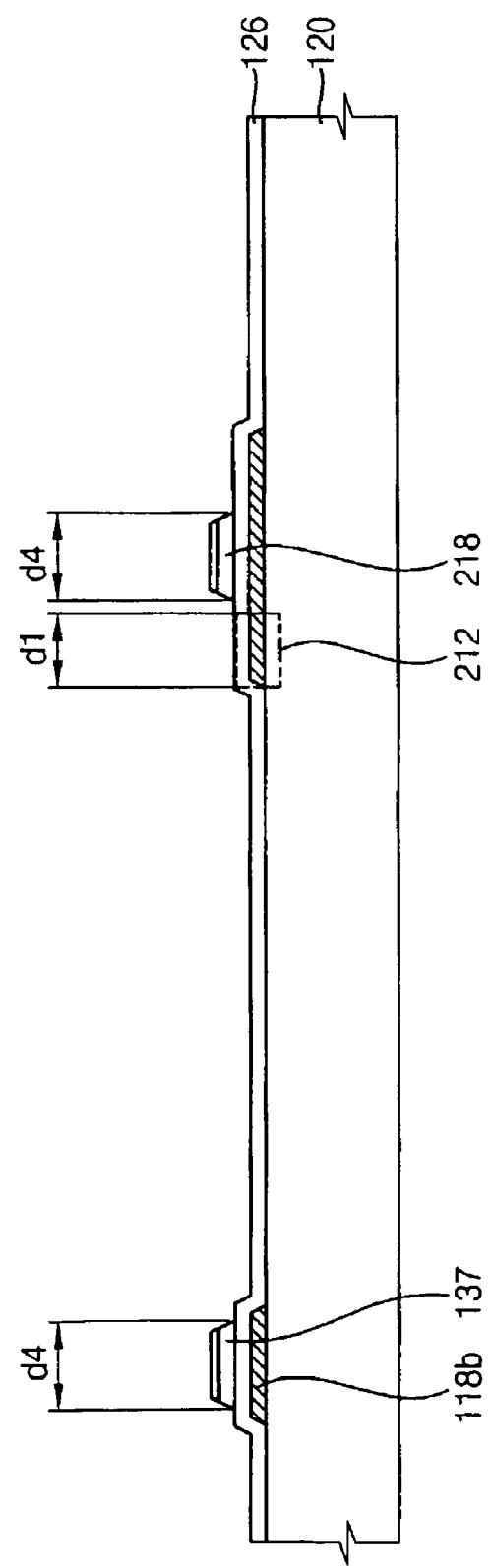

Referring to FIGS. 2 and 8, the exposed second photoresist layer 154 is developed to form a plurality of photoresist patterns (not shown) corresponding to the semiconductor layer pattern 137 and the semiconductor layer testing portion 218, respectively, on the gate insulating layer 126. The semiconductor layer 144 is partially etched using the photoresist patterns corresponding to the semiconductor layer pattern 137 and the semiconductor layer testing portion 218 as an etching mask to form the semiconductor layer pattern 137 and the semiconductor layer testing portion 218.

Figure 9:
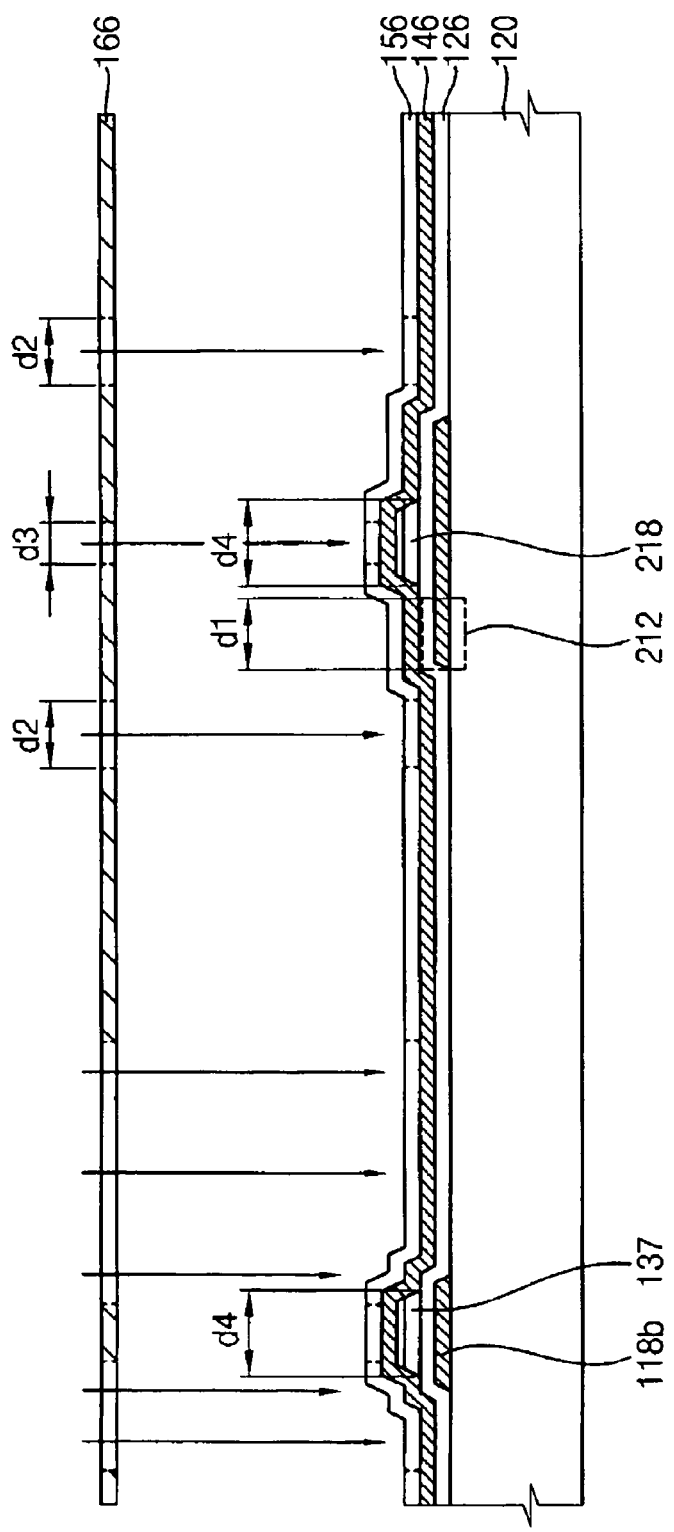

Referring to FIGS. 2 and 9, a second conductive layer 146 is deposited on the gate insulating layer 126 having the semiconductor layer pattern 137 and the semiconductor layer testing portion 218. A third photoresist layer 156 is coated on the second conductive layer 146. The third photoresist layer 156 is exposed using a third mask 166. The third mask 166 includes a plurality of reticles corresponding to the data lines DL1, DL2, . . . DLM, the source electrode 118a, the drain electrode 118c, the data testing portion 214 and the electrode testing portion 216. The reticles corresponding to the source electrode 118a and the electrode testing portion 216 have substantially the same widths d3 and d3' as the source electrode 118a and the electrode testing portion 216. Each of the reticles corresponding to the data lines DL1, DL2, . . . DLM and the data testing portion 214 has substantially the same width d2 as each of the data lines DL1, DL2, . . . DLM and the data testing portion 214.

Figure 10:
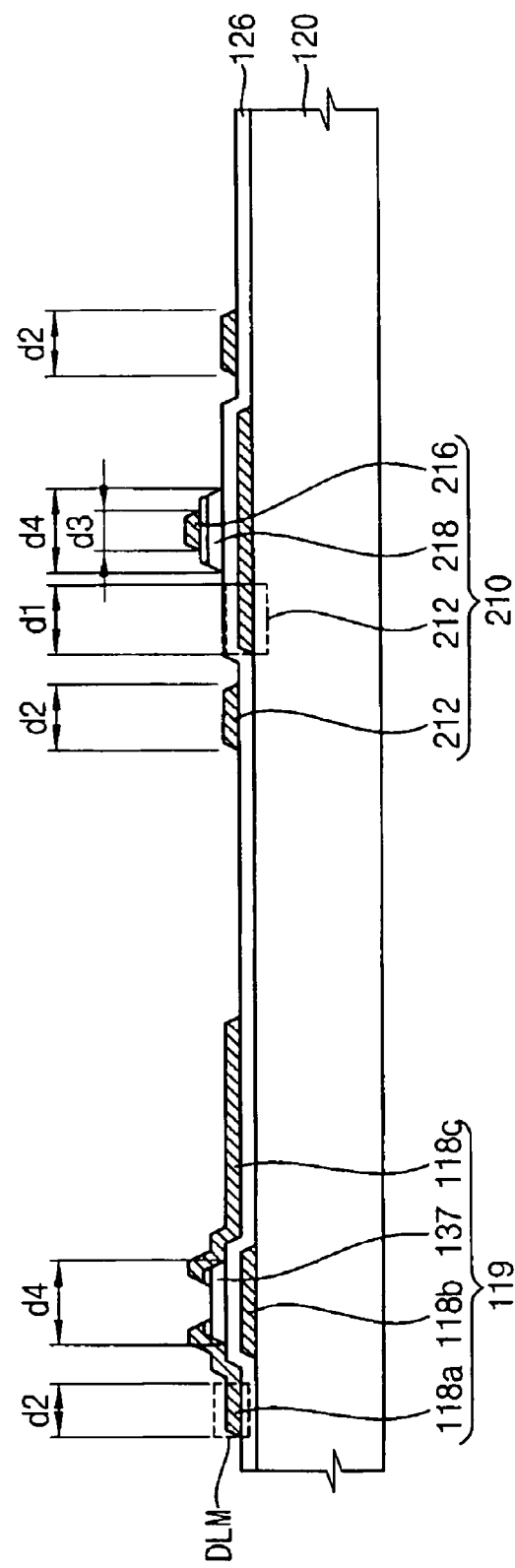

Referring to FIGS. 2 and 10, the exposed third photoresist layer 156 is developed to form a plurality of photoresist patterns (not shown) corresponding to the data lines DL1, DL2, . . . DLM, the source electrode 118a, the drain electrode 118c, the data testing portion 214 and the electrode testing portion 216 on the second conductive layer 146. The second conductive layer 146 is partially etched using the photoresist patterns as an etching mask to form the data lines DL1, DL2, . . . DLM, the source electrode 118a, the drain electrode 118c, the data testing portion 214 and the electrode testing portion 216 on the second conductive layer 146.

Figure 11:
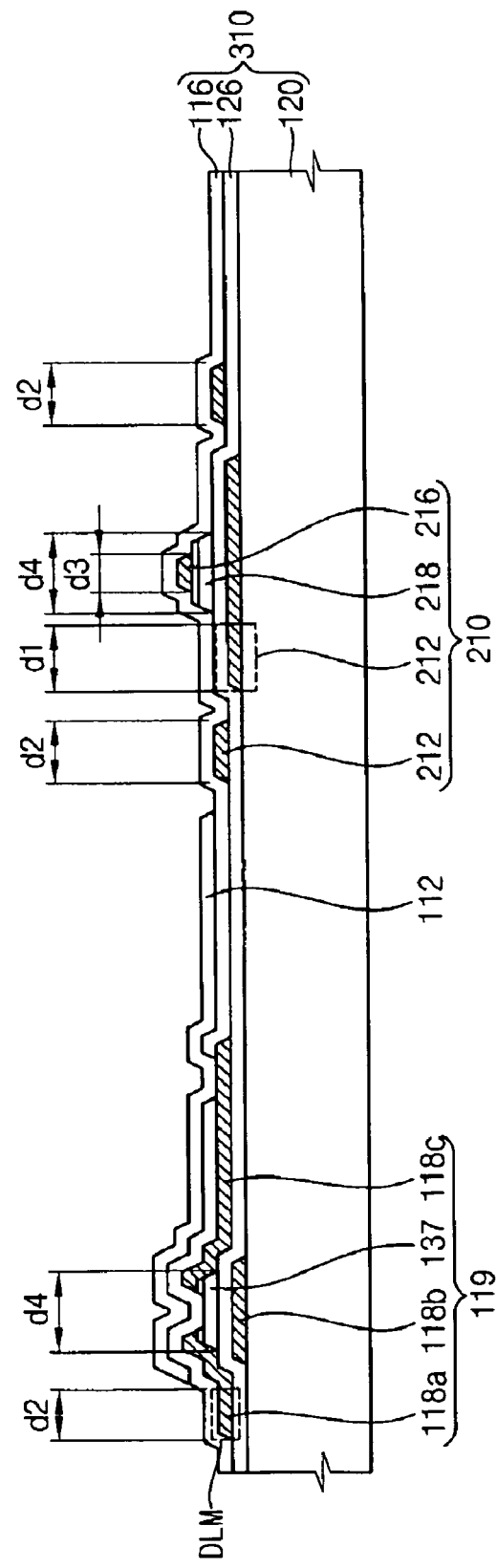

Referring to FIGS. 2 and 11, the passivation layer 116 is deposited on the gate insulating layer 116 having the data lines DL1, DL2, . . . DLM, the source electrode 118a, the drain electrode 118c, the data testing portion 214 and the electrode testing portion 216. The contact hole through which the drain electrode 118c is partially exposed is formed in the passivation layer 116. A transparent conductive layer is deposited on the passivation layer 116, and the transparent conductive layer is partially etched to form the pixel electrode 112. The pixel electrode 112 is electrically connected to the drain electrode 118c through the contact hole.

The portion of the source electrode 118a that is on the gate insulating layer 126 has a different height from the remaining portion of the source electrode 118a that is on the semiconductor layer pattern 137. The different heights in the source electrode 118a cause the second conductive layer 146 to be irregularly exposed and etched. Therefore, the portion of the source electrode 118a on the gate insulating layer 126 has a different width from the remaining portion of the source electrode 118a on the semiconductor layer pattern 137. In addition, the portion of the electrode testing portion 216 that is on the gate insulating layer 126 has a different height from the remaining portion of the electrode testing portion 216 that is on the semiconductor layer testing portion 218. As with the source electrode 118a, this height variation in the electrode testing portion 216 causes the second conductive layer 146 to be irregularly exposed and etched. Therefore, the portion of the electrode testing portion 216 on the gate insulating layer 126 has the different width from the remaining portion of the electrode testing portion 216 on the semiconductor layer testing portion 218.

Figure 12:
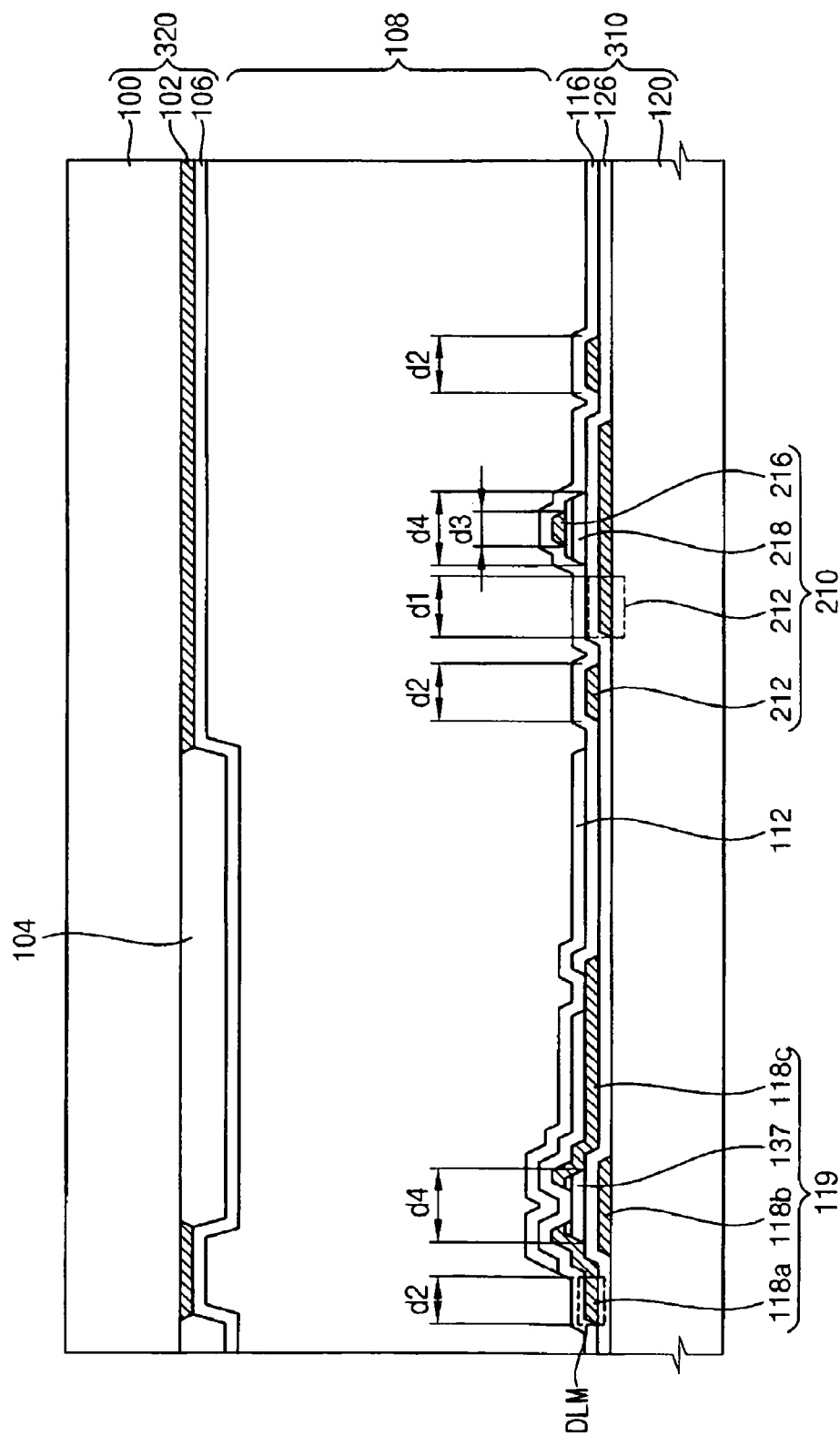

Referring to FIG. 12, chromium, chromium oxide or chromium nitride is deposited on the upper substrate 101 and patterned to form the black matrix 102 through a photolithography process. Alternatively, a photoresist layer having an opaque material may be coated on the upper substrate 101 and patterned to form the black matrix 102 through a photolithography process.

To form the color filter 104, an organic layer is coated on the upper substrate 101 having the black matrix 102. The organic layer is patterned through a photolithography process to form the color filter 104. In some embodiments, the edge portions of adjacent color filters may be overlapped to form the black matrix 102.

A transparent conductive layer is deposited on the upper substrate 101 having the black matrix 102 and the color filter 104 to form the common electrode 106. Examples of a transparent conductive material for forming the common electrode 106 include indium tin oxide (ITO), tin oxide (TO), indium zinc oxide (IZO), zinc oxide (ZO), indium tin zinc oxide (ITZO), amorphous indium tin oxide (a-ITO), etc.

The spacer (not shown) is formed on the color filter 104.

A liquid crystal is injected between the first and second substrates 310 and 320 and is sealed by the sealant (not shown) to form the liquid crystal layer 108. Alternatively, the liquid crystal may be dropped on the first substrate 310 or the second substrate 320 that has the sealant around its edges (not shown) before combining the first and second substrates 310, 320 to form the liquid crystal layer 108.

According to the liquid crystal display (LCD) device shown in FIGS. 1 to 12, the gate testing portion 212 having substantially the same width as each of the gate lines GL1, GL2, . . . GLN, the data testing portion 214 having substantially the same width as each of the data lines DL1, DL2, . . . DLM, the semiconductor layer testing portion 218 having substantially the same width as the semiconductor layer pattern 137, and the electrode testing portion 216 having substantially the same width as the source electrode 118a are formed on the lower substrate 120. Forming these testing portions on the lower substrate 120 facilitates the testing of the widths of the gate lines GL1, GL2, . . . GLN, the data lines DL1, DL2, . . . DLM, the semiconductor layer pattern 137 and the source electrode 118a.

As mentioned above, the distance S1 between the left portion of the gate testing portion 212 and the electrode testing portion 218 is compared with the distance S2 between the right portion of the gate testing portion 212 and the electrode testing portion 218. Comparison of the distances S1 and S2 detects the degree of misalignment between the layer for forming the gate lines GL1, GL2, GLN and the layer for forming the data lines DL1, DL2, . . . DLM.

Figure 13:
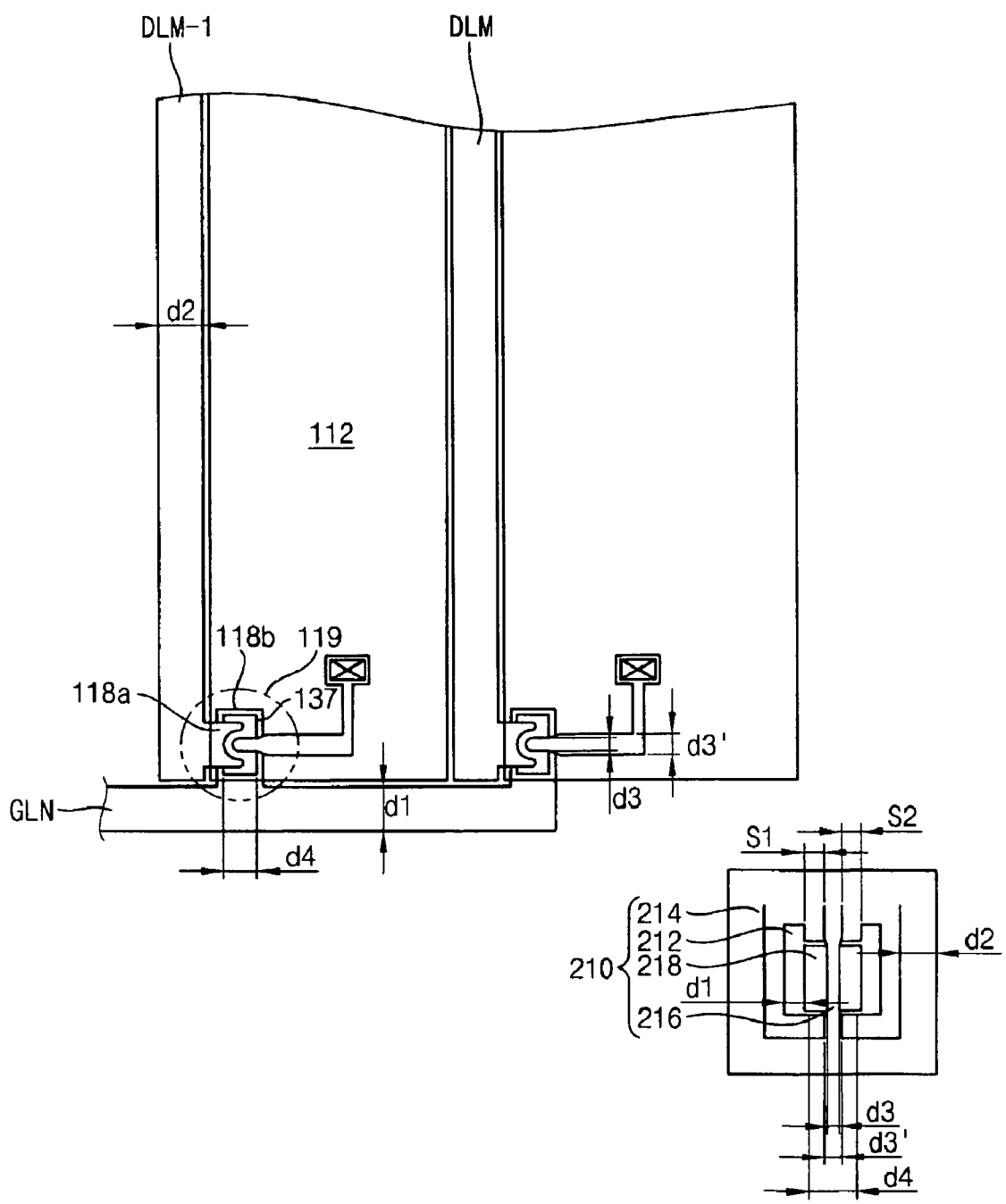
FIG. 13 is a plan view illustrating an LCD device in accordance with another embodiment of the present invention.

FIG. 13 is a plan view illustrating an LCD device in accordance with another embodiment of the present invention. The LCD device of FIG. 13 is the same as in FIGS. 1 and 12 except for a thin-film transistor. Thus, same reference numerals will be used to refer to the same or like parts as those described in FIGS. 1 and 12, and any redundant explanation will be omitted.

Referring to FIGS. 1, 2 and 13, the LCD device includes the gate driving circuit 100, the LCD panel 300, the data driving circuit 370 and the flexible circuit board 400.

The LCD panel 300 includes a first substrate 310, a second substrate 320 and a liquid crystal layer 108.

The first substrate 310 includes the lower substrate 120, gate lines GL1, GL2, . . . GLN, data lines DL1, DL2, . . . DLM, pixel thin-film transistors 119, the gate insulating layer 126, the passivation layer 116, liquid crystal capacitors Clc and pixel electrodes 112 in the display region DA. The first substrate 310 may further include the testing members 210 adjacent to corners of the first substrate 310.

The pixel thin-film transistors 119 are on the lower substrate 120 (see FIG. 12). Each of the pixel thin-film transistors 119 includes the source electrode 118a, the gate electrode 118b, the drain electrode 118c and the semiconductor layer pattern 137. A portion of the drain electrode 118c is on the gate insulating layer 126, and the remaining portion of the drain electrode 118c is on the semiconductor layer pattern 137. The width d3' of the portion of the drain electrode 118c on the gate insulating layer 126 is greater than the width d3 of the remaining portion of the drain electrode 118c on the semiconductor layer pattern 137.

The testing members 210 are on the lower substrate 120. Each of the testing members 210 includes a gate testing portion 212, a data testing portion 214, an electrode testing portion 216 and a semiconductor layer testing portion 218.

The electrode testing portion 216 is formed from the same layer as the drain electrode 118c. Alternatively, the electrode testing portion 216 is formed on the same layer as the drain electrode 118c. The electrode testing portion 216 has two widths d3 and d3' that are substantially the same as the width of the drain electrode 118c. That is, a portion of the electrode testing portion 216 is on the gate insulating layer 126, and the remaining portion of the electrode testing portion 216 is on the semiconductor layer testing portion 218. The width d3' of the portion of the electrode testing portion 216 on the gate insulating layer 126 is greater than the width d3 of the remaining portion of the electrode testing portion 216 on the semiconductor layer testing portion 218.

According to the LCD device shown in FIG. 13, the width d3 of the remaining portion of the drain electrode 118c on the semiconductor layer pattern 137 is easily measured.

Figure 14:
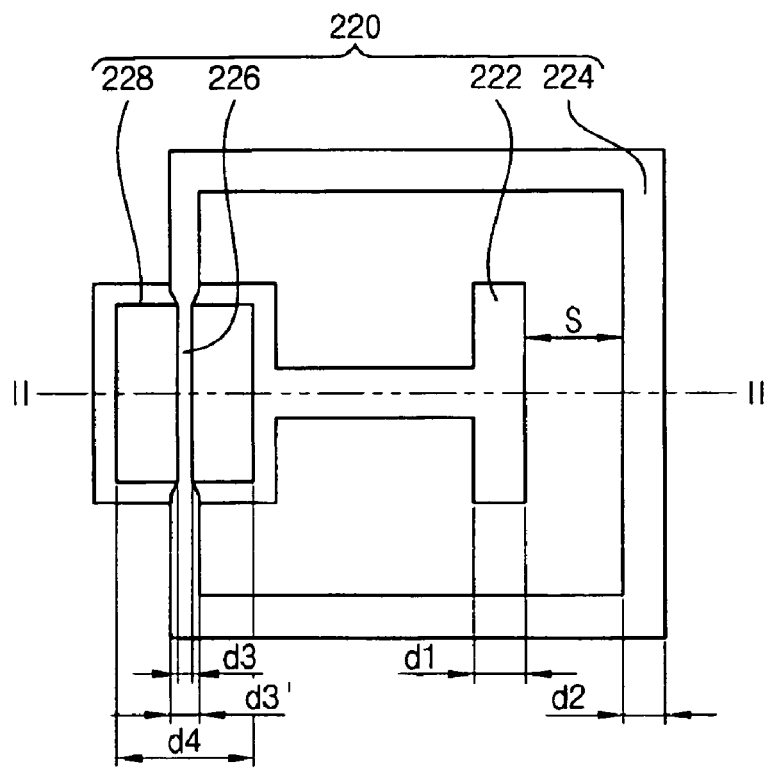
FIG. 14 is a plan view illustrating a testing member in accordance with another embodiment of the present invention.
Figure 15:
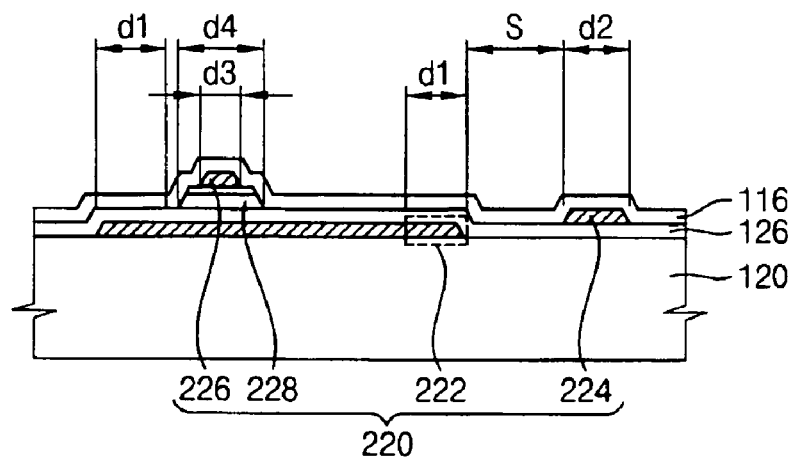
FIG. 15 is a cross-sectional view taken along the line II-II' shown in FIG. 14.

FIG. 14 is a plan view illustrating a testing member in accordance with another embodiment of the present invention. FIG. 15 is a cross-sectional view taken along the line II-II' shown in FIG. 14. An LCD device of FIGS. 14 and 15 is the same as the device in FIGS. 1 and 12 except for the testing member. Thus, same reference numerals will be used to refer to the same or like parts as those described in FIGS. 1 and 12 and any redundant explanation will be omitted.

As shown in FIGS. 2, 14 and 15, the testing member 220 is on the lower substrate 120. The testing member 220 includes a gate testing portion 222, a data testing portion 224, an electrode testing portion 226 and a semiconductor layer testing portion 228. The gate testing portion 222 is formed from the same layer as the gate lines GL1, GL2, . . . GLN. Alternatively, the gate testing portion 222 may be formed on the same layer as the gate lines GL1, GL2, . . . GLN. The width dl of the gate testing portion 222 is substantially the same as the width of each of the gate lines GL1, GL2, . . . GLN. The data testing portion 224 is formed from the same layer as the data lines DL1, DL2, . . . DLM. Alternatively, the data testing portion 224 may be formed on the same layer as the data lines DL1, DL2, . . . DLM. The width d2 of the data testing portion 224 is substantially the same as the width of each of the data lines DL1, DL2, . . . DLM. The semiconductor layer testing portion 228 is formed from the same layer as the semiconductor layer pattern 137. Alternatively, the semiconductor layer testing portion 228 may be on the same layer as the semiconductor layer pattern 137. The width d4 of the semiconductor layer testing portion 228 is substantially the same as the width of the semiconductor layer pattern 137. That is, the gate testing portion 222 is on the lower substrate 120, and the data testing portion 224 is on the gate insulating layer 126. The semiconductor layer testing portion 228 is also on the gate insulating layer 126. The electrode testing portion 226 is formed from the same layer as the source electrode 118a. Alternatively, the electrode testing portion 226 may be on the same layer as the source electrode 118a. The electrode testing portion 226 has two widths d3 and d3' that are substantially the same as the width of the source electrode 118a. That is, a portion of the electrode testing portion 226 is on the gate insulating layer 126, and the remaining portion of the electrode testing portion 226 is on the semiconductor layer testing portion 228. The width d3' of the portion of the electrode testing portion 226 that is on the gate insulating layer 126 is greater than the width d3 of the electrode testing portion 226 that is on the semiconductor layer testing portion 228.

As shown in FIG. 14, the data testing portion 224 and the electrode testing portion 226 form a substantially rectangular frame. A portion of the gate testing portion 222 having substantially the same width dl as each of the gate lines GL1, GL2, . . . GLN is in the rectangular frame formed by the data testing portion 224 and the electrode testing portion 226. A remaining portion of the gate testing portion 222 is under the semiconductor layer testing portion 228 and the electrode testing portion 226. The semiconductor layer testing portion 228 is on the remaining portion of the gate testing portion 222. The electrode testing portion 226 is positioned along a center line of the semiconductor layer testing portion 228.

In the testing member shown in FIGS. 14 and 15, the distance S between the gate testing portion 222 and the data testing portion 224 is compared to a predetermined value to detect any misalignment between the layer for the gate lines GL1, GL2, . . . GLN and the layer for the data lines DL1, DL2, . . . DLM. In one embodiment of the testing member 220, the distance S between the gate testing portion 222 and the data testing portion 224 is compared to the distance between a reticle corresponding to the gate testing portion 222 and a reticle corresponding to the data testing portion 224.

According to the present invention, the gate testing portion having substantially the same width as each of the gate lines, the data testing portion having substantially the same width as each of the data lines, the semiconductor layer testing portion having substantially the same width as the semiconductor layer pattern, and the electrode testing portion having substantially the same width as one of the source and drain electrodes are formed on the lower substrate. By forming these testing portions on the lower substrate, the widths of the gate lines, the data lines, the semiconductor layer pattern and the one of the source and drain electrodes may be easily tested.

In addition, the distance between the left portion of the gate testing portion and the electrode testing portion is compared to the distance between the right portion of the gate testing portion and the electrode testing portion. The difference between the two distances indicates the amount of a misalignment between the layer for forming the gate lines and the layer for forming the data lines. In some embodiments, the distance between the gate testing portion and the data testing portion is compared to a predetermined value to determine the amount of the misalignment between the layer for forming the gate lines and the layer for forming the data lines.

By adopting the foregoing method, manufacturing time and manufacturing cost of a display substrate are decreased. In addition, the yield of the display substrate is increased and an image display quality of the display device is improved.

This invention has been described with reference to exemplary embodiments. It is evident, however, that alternative modifications and variations will be apparent to those having skill in the art in light of the foregoing description. Accordingly, the present invention embraces all such alternative modifications and variations as falling within the spirit and scope of the appended claims.

What is claimed is:
1. A display substrate comprising:
a base substrate;
a conductive line on the base substrate;
a switching element including:
    a gate electrode on the base substrate;
    a semiconductor layer pattern on the gate electrode;

a first electrode on the semiconductor layer pattern, the first electrode electrically connected to the conductive line; and a second electrode spaced apart from the first electrode on the semiconductor layer pattern; and a testing member for testing a misalignment in the switching element, the testing member including:

a conductive line testing portion formed from the same layer as the conductive line, the conductive line testing portion having substantially the same width as the conductive line;

an electrode testing portion formed from the same layer as the first electrode, the electrode testing portion having substantially the same width as the first electrode; and a semiconductor layer testing portion between the electrode testing portion and the base substrate.

2. The display substrate of claim 1, wherein the conductive line comprises a data line.

3. The display substrate of claim 2, further comprising a gate line formed from the same layer as the gate electrode that is electrically connected to the gate line, the gate line extending substantially perpendicularly to the data line.

4. The display substrate of claim 3, wherein the testing member further comprises a gate testing portion formed from the same layer as the gate line, and the gate testing portion has substantially the same width as the gate line.

5. The display substrate of claim 4, wherein the electrode testing portion extends along a center line of the gate testing portion.

6. The display substrate of claim 5, wherein a difference between a first distance and a second distance indicates an amount of misalignment between a layer for forming the gate line and a layer for forming the data line, wherein the first distance is the distance between a first portion of the gate testing portion and the electrode testing portion and the second distance is the distance between a second portion of the gate testing portion and the electrode testing portion.

7. The display substrate of claim 4, wherein a difference between a predetermined value and a distance between the gate testing portion and the electrode testing portion indicates an amount of misalignment between a layer for forming the gate line and a layer for forming the data line.

8. The display substrate of claim 1, wherein the semiconductor layer pattern has substantially the same width as the semiconductor layer testing portion.

9. The display substrate of claim 1, wherein the testing member is adjacent to a corner of the base substrate.

10. A liquid crystal display device comprising:

a first member including:

a base substrate;

a conductive line on the base substrate;

a switching element including a gate electrode on the base substrate, a semiconductor layer pattern on the gate electrode, a first electrode formed on the semiconductor layer pattern and electrically connected to the conductive line, and a second electrode spaced apart from the first electrode and on the semiconductor layer pattern; and a testing member for testing a misalignment in the switching element, the testing member including a conductive line testing portion formed from the same layer as the conductive line and having substantially the same width as the conductive line, an electrode testing portion formed from the same layer as the first electrode and having substantially the same width as the first electrode, and a semiconductor layer testing portion between the electrode testing portion and the base substrate;

a second member substantially parallel to the first member; and a liquid crystal layer interposed between the first member and the second member.

* * * * *